US006994258B2

(12) United States Patent
Lewis

(10) Patent No.: US 6,994,258 B2
(45) Date of Patent: Feb. 7, 2006

(54) TECHNICIAN SAFETY CONFIRMATION

(76) Inventor: Richard Jeffrey Lewis, 1970 Latham St. #2, Mountain View, CA (US) 94040

( * ) Notice: Subject to any disclaimer, the term of this patent is extended or adjusted under 35 U.S.C. 154(b) by 145 days.

(21) Appl. No.: 10/211,636

(22) Filed: Aug. 2, 2002

(65) Prior Publication Data

US 2003/0024992 A1 Feb. 6, 2003

Related U.S. Application Data

(60) Provisional application No. 60/310,187, filed on Aug. 6, 2001.

(51) Int. Cl.
*G06K 7/10* (2006.01)

(52) U.S. Cl. ............................ 235/472.01; 235/462.43

(58) Field of Classification Search ........... 235/472.01, 235/462.45, 462.46, 462.13, 462.01, 375, 235/385, 383, 462.43
See application file for complete search history.

(56) References Cited

U.S. PATENT DOCUMENTS

| | | | | |
|---|---|---|---|---|
| 5,099,437 | A * | 3/1992 | Weber | 702/187 |
| 5,478,990 | A * | 12/1995 | Montanari et al. | 235/375 |
| 5,724,261 | A * | 3/1998 | Denny et al. | 702/184 |
| 6,170,746 | B1 * | 1/2001 | Brook et al. | 235/385 |

* cited by examiner

*Primary Examiner*—Karl D. Frech
(74) *Attorney, Agent, or Firm*—Gary Baker; Quine Intellectual Property Law Group, P.C.

(57) ABSTRACT

The present invention provides safety confirmation or hazard warning to a technician in the field, e.g., by scanning an equipment identification label and comparing the identification to a schedule of equipment inactivation times. The systems and methods of the invention can optionally provide remote interactions to reschedule inactivations or to protect the technician by lock-out from a hazardous condition.

20 Claims, 1 Drawing Sheet

TECHNICIAN SAFETY CONFIRMATION

CROSS-REFERENCE TO PRIOR APPLICATIONS

This application claims priority to and benefit of a prior U.S. provisional application No. 60/310,187, Technician Safety Confirmation, by Richard Jeffrey Lewis filed Aug. 6, 2001.

| | |
|---|---|
| Inventor: | Richard Jeffrey Lewis<br>1970 Latham Street #2<br>Mountain View, CA 94040 |
| Attorney: | Gary Baker<br>PTO Reg. # 41,595<br>1563 Boxwood Avenue<br>San Leandro, CA 94579-1303<br>(510) 483-8220 |

U.S. PATENT DOCUMENTS

| | | |
|---|---|---|
| 4,911,198 | Mar. 27, 1990 | U.S. Pat. No. |
| 6,268,574 | Jul. 31, 2001 | U.S. Pat. No. |

BACKGROUND OF THE INVENTION

This invention relates to systems of lock-out/tag-out (LOTO) to protect technicians providing maintenance and monitoring of equipment. Lock-out/tag-out systems can give notice to technicians of the status of equipment and/or prevent access to hazardous environments.

Before performing monitoring, maintenance or repair of electronic or mechanical equipment, a safe environment must be provided for the technician. Safety can be provided by hazard labels, status indicators, identity labels and locks. Safety can be enhanced by redundant lock-out and/or tag-out systems.

Hazard labels are a common form of reducing hazards to technicians. Many new products provide notice to users on ways to avoid harm to themselves and the appliance in the owners manual. Hazard warning labels are often present on access panels to warn technicians of voltage and mechanical danger. Such panels can be linked, as a safety feature, to the equipment power source to shut off power if the panel is opened.

Tag out systems can provide notice of danger and indicate requirements for access to work areas. A brightly colored tag can be attached to the latch of an access door to, e.g., warn of the internal hazards, indicate the proper procedure for safe entry, and/or to inform a technician of compliance documentation requirements for entry.

Lock out systems can prevent unauthorized individuals from gaining entry to hazardous areas. Access doors to hazardous work areas and equipment can be secured with a lock with the key or code available only to properly trained technicians. In this way, uninformed technicians can not casually enter a hazardous work environment. More sophisticated lock out systems can include safety confirmation by a computer or manager before technician entry is allowed. For example, a manager in a control room can remotely control the lock to a door in a hazard area. The manager can confirm the inactivation of hazards before allowing entry of the technician.

Another way to provide an element of safety to technicians in hazardous work environments is through scheduling systems. For example, a master schedule of equipment inactivation can be established so the technician and other workers at remote locations know what equipment is to be inactivated at what time and date. However, when the technician works over the scheduled inactivation time or if a remote worker fails to review the schedule, the equipment can be activated while the technician is still in danger.

Fail safe systems can be incorporated into technician safety systems. For example, in U.S. Pat. No. 6,268,574, "Electrical and Pneumatic Lock-Out Device", to Edens, a lock out device is incorporated into access doors to hazardous areas whereby power can not be supplied to equipment when the door to the work area is opened. In another example, U.S. Pat. No. 4,911,198, "Securing System for Automatically Operated Valve Systems", to Kerin, a locking clip is provided for a technician to override any remote activation signal to equipment in a hazardous work area.

A need remains for additional ways to ensure the safety of technicians. For example, a way to evaluate equipment identification, technician identification, scheduling and equipment status before and during maintenance procedures can help prevent accidents. The present invention provides these and other features which will be apparent upon complete review of the following.

SUMMARY OF THE INVENTION

The present invention provides systems and methods to provide safety confirmation or hazard warning to technicians in the field approaching work sites or equipment for repair, preventive maintenance or condition monitoring. The safety status of equipment can be confirmed by identifying the equipment and determining the scheduled activation status of the equipment.

The technician safety system of the invention can include, e.g., a portable computer with a scanner device, software with a database of equipment maintenance information, and equipment (work site) identification labels readable by the scanner device and associated with a work site or piece of equipment so that a technician can scan a label to receive a safety confirmation or hazard warning. The portable computer can be, e.g., a hand held computer or a lap top computer. The safety system can include a central computer with a communication port, such as, e.g., a serial or parallel communications port, an internet modem or a wireless communication port, to communicate with the portable computers. The system of the invention can include a lock-out device, such as a remotely controlled lock-out device controlled by a central computer. The system of the invention can include, e.g., identification labels with bar-coded information.

The equipment maintenance information of the invention can include, e.g., equipment identifications, equipment locations, technician identification, technician qualifications, equipment maintenance schedules, equipment inactivation times, process requirements for equipment activation, or equipment maintenance histories, and/or other information useful to identifications, logical instructions, and/or safety documentation.

The methods of work environment safety determination in the invention can include, e.g., inputting equipment maintenance information such as equipment inactivation times into a computer system, scanning an identification label associated with a piece of equipment or work site to input equipment identification information into the computer system, and determining the safety of the work environment by comparing a current time, the equipment identification, and the scheduled inactivation times. The method can, e.g., provide a safety confirmation if the current time corresponds to an inactivation time for the identified equipment. The method can, e.g., provide a hazard warning if the current time does not correspond to an inactivation time for the identified equipment.

The method can include, e.g., portable computer as the computer system or as a component of the computer system. The portable computer can have a scanning capability for identifying equipment by scanning a bar-coded label associated with the equipment or work site. The equipment identification can be transmitting from the portable scanner to a central computer, e.g., by wireless communication. The central computer or portable computer can include, e.g., engagement of a lock-out mechanism at the work environment if a hazard warning condition exists.

The method of the invention can optionally include, e.g., inputting technician qualification information into the computer, inputting technician identification into the computer, inputting workplace entry requirements into the computer, and confirming the identified technician is qualified to enter the work environment by comparing the technician identification, the technician qualifications and the entry requirements. Inputting the technician identification can include input of a password, e.g., to assure qualifications. The method can include engaging a lock-out condition if the technician qualifications do not meet the work environment entry requirements.

The method of the invention can include, e.g., inputting task completion information in the computer to document compliance with regulations and schedules.

DESCRIPTION OF THE FIGURE

The FIGURE is a schematic diagram of an exemplary technician safety system. Portable computer 10 comprises a scanner 11 capable of reading label 12 associated with work site or piece of equipment 14. Optional central computer 15 can communicate with the portable computer through communication ports 16, e.g., through a cable or by wireless transmissions. Optional lock out and/or tag out device 17 can control access to the work site or piece of equipment and/or provide information to a technician.

DETAILED DESCRIPTION OF THE INVENTION

Figure 1:
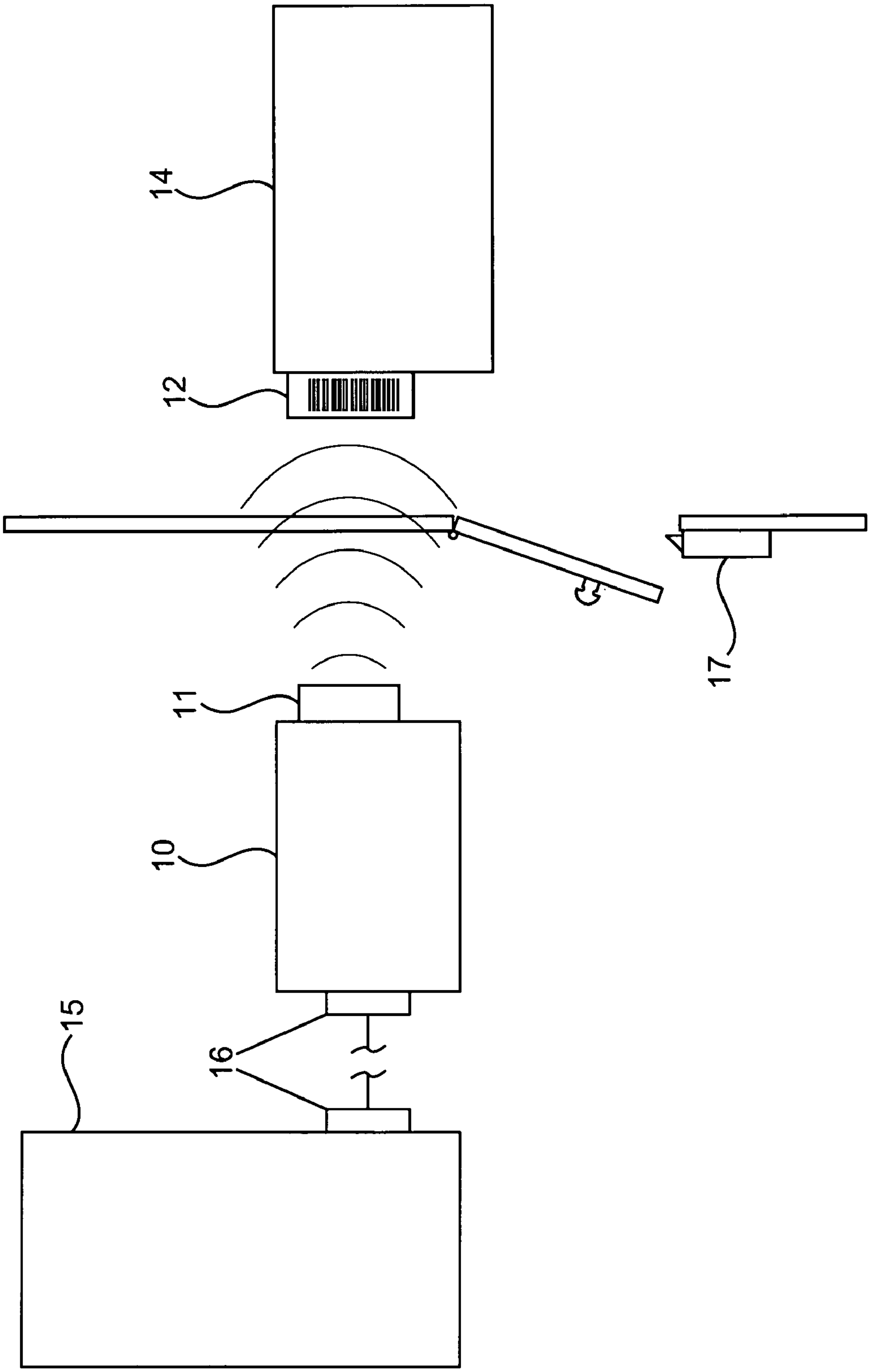

The present invention provides systems and methods, e.g., to ensure safety of technicians that do their work in hazardous work environments. Systems of the invention provide, e.g., a portable computer with a scanner to confirm hazardous equipment are inactivated at an intended work site. Methods of the invention include computerized methods for, e.g., creating a data base of equipment maintenance information, real time on site identification of intended work environments, and confirmation of hazard inactivation.

Technician Safety Systems

Systems of the invention for protection of technicians in potentially hazardous work environments provide, e.g., access to essential equipment maintenance information, including safety information, from portable instruments including computer and scanning subsystems. Safety systems of the invention can also include equipment identification markers to identify equipment and password entry requirements to identify technicians.

Computers

Portable computers of the invention can be, e.g., fully integrated computer systems and/or portable computer elements capable of exchanging data with central computer work stations. A computer system, of the invention can be a single computer, a network of computers, a portable computer with capabilities to practice the methods of the invention, and/or a system of computers capable of transmitting data between each other. Computer systems of the invention can include, e.g., a clock and a calendar.

The portable computer of the invention can be, e.g., a hand held computer, such as a Palm Pilot or any of the many commercially available personal assistants. The portable computer, for purposes of this invention, can be any portable device capable of electronic data storage, transfer and/or retrieval. The portable computer can be a lap top computer. The portable computer can include a data storage capability, such as RAM chips, hard drives, and the like.

The portable computer can be, e.g., capable of exchanging data with a central computer. The portable computer can include a communication port, such as a parallel or serial data transmission port for exchange of data and instruction sets with a central computer through a communication cable. Data exchange can be provided, e.g., without a cable by methods known in the art such as, radio, LAN, cell phone, or infrared transmission. Data exchange can be provided remotely, e.g., through internet communications.

A technician can input data to the portable computer, e.g., at a work site. The portable computer can include, e.g., a keyed input, pull down menu navigation with a curser, a stylus input, scanner input, and/or the like. Scanner input to the portable computer can be used, e.g., to easily identify a work site or piece of equipment by passing the scanner over an attached bar coded label.

A central computer can provide benefits in the invention by, e.g., allowing coordination of data exchanges between multiple technicians at multiple work sites. Having many of the system requirements, such as, e.g., scheduling software or storage of equipment maintenance information histories, in a central computer, the portable computer can be made smaller and lighter. The central computer can be a personal computer, a main frame, a server and/or one or more computers in a communication network.

Software

Software of the invention includes, e.g., instruction sets and/or data sets retained in the computer systems of the invention. The software can direct storage of equipment maintenance information into the memories of the computer system. Software can include commercially available preventive maintenance software, spreadsheets such as ExCel software, and other applicable software known in the art. Software of the invention can, e.g., provide interactive capabilities such as real time rescheduling and remote lock-out.

Software of the invention can provide schedules that can, e.g., coordinate efficient operations in a work place while allowing equipment inactivation during preventive maintenance and/or condition monitoring operations by technicians. The software can simply, e.g., maintain an available database of equipment maintenance information, such as a spreadsheet, including entries of equipment identifications, scheduled inactivation times, equipment monitoring data, safety checklists, and the type of maintenance operation to be preformed. More comprehensive databases of equipment maintenance information can include, e.g., technician identifications, technician qualifications, equipment monitoring data, and process requirements for equipment activation. More sophisticated software can operate on instruction sets that can, e.g., compare a technician's qualifications to operations to confirm the technician is qualified for the work, (such software can require a password input to confirm the technician identity before giving permissions.) Interactive software can, e.g., receive input of an equipment inactivation request, compare the request to the schedule and confirm or deny permission to proceed. Interactive software can compare the equipment identification to equipment monitoring data from the equipment to evaluate the current or projected safety conditions to grant or deny access to work on the equipment. Interactive software can provide a relevant safety checklist to the technician and deny access to the equipment if required safety conditions do not exist.

More sophisticated interactive software can, e.g., receive input of an equipment inactivation request, compare the request to the scheduled inactivations, and schedule the requested inactivation if it was not previously scheduled if it would not hinder the function of overall workplace processes (such as, e.g., manufacturing, communications, and the like.) Still more interactive software (with associated hardware) can, e.g., activate lock out/tag out mechanisms to physically or virtually prevent technician access to a hazardous work site.

Software can provide documentation useful in technician training, increasing workplace efficiency and recordation of regulatory compliance. The history of technician activities can highlight the efficiency and appropriateness of actions useful, e.g., in educational feedback from managers. The history of technician experience and equipment monitoring activities can provide, e.g., evidence of compliance with safety regulations, manufacturing regulations, and the like.

Equipment Identification Labels

Equipment and/or work sites can be identified, e.g., by affixing an equipment identification label on or near the equipment or work site. The label can provide information as simple as an identification number that can be cross referenced to identify the equipment, or provide extensive text describing the identity and history of the equipment. Equipment status and history can be more readily available and up to date if the label is associated with, e.g., a dynamic database of equipment maintenance and scheduling software. Labels that supply information readable by the technician and which can be scanned as input to a computer system can provide comprehensive current information for worker safety.

Identification labels can be associated with equipment or work sites in any fashion, known in the art, e.g., that provides unambiguous and ready identification of the equipment or work site. For example, identification labels can be metal, paper, ceramic or plastic, adhesive backed sheets imprinted with identifying symbols and attached by contact with the equipment surface. The labels can be placards or tags attached to the equipment by screws, chains, clips, and/or the like.

The identification symbols can be, e.g., color coding, alphanumeric characters, pictographs, and/or bar codes, as described in co pending application Ser. No. 09/729,581 "Task Indicator Decals for Preventive Maintenance and Condition Monitoring Systems", filed Dec. 4, 2000, by this inventor.

Technician Safety Methods

The methods of the invention for technician safety provide, e.g., identification of equipment or work environments, and confirmation of inactivation (safety confirmation). The method can include, e.g., preparation of an equipment maintenance information database, identification of equipment to be worked on, and confirmation of safety. The methods can optionally include, e.g., scanning identification with a portable computer, real time interaction with a computer to confirm safety or provide a hazard warning, lock-out of technicians, real time rescheduling of inactivations, and maintenance of compliance data.

Database Inputs

Databases, as described above in the Software section, can include a wide variety of information relevant to technician safety, scheduling, and compliance. Such data can be input, e.g., from a workstation keyboard at a central computer, keys or upload features on a portable computer, by scanning a bar-coded ID label, and the like.

A master equipment maintenance and inactivation schedule can be input, e.g., at an office workstation in communication with a central computer. Equipment maintenance information, such as, e.g., equipment identifications, locations, maintenance schedules, known hazards, qualifications to operate, regulatory requirements, and the like, can be input on a keyboard to establish the information necessary to operate the safety systems of the invention.

At the work site, a technician can input information necessary to confirm the environment is safe for operations. The technician can log on with a password to gain access to the safety system; the technician may have various levels of authorization to access and/or modify data and commands. The technician can, e.g., manually enter an equipment identification number or scan a bar-coded label attached to the equipment to enter the identification into the computer system.

Computer System Outputs

The technician can, e.g., receive confirmation of inactivation of the equipment or safe conditions at the work site after the identification procedure. The confirmation can be as simple as, e.g., an affirmatory "beep" or green light. The safety confirmation can be, e.g., a message on a computer screen or LED display. If an unsafe condition exists, the response from the portable computer can be a hazard warning sound, light or message. A portable computer with a complete data base of work process functions and schedules can, e.g., consider the situation and adjust the inactivation schedule to accommodate a technician request for access. Optionally, the portable computer can communicate with a central computer to obtain such information and instructions.

In an aspect of the invention, the computer system can, e.g., actuate a lock out or tag out condition at the equipment or work site. For example, should a technician intent on a maintenance procedure request confirmation of identity and inactivation for a hazardous work site, the computer system can fail to disengage a mechanical lock-out device and energize a hazard warning to the technician. In another example, should a technician scan an identity label on a piece of equipment with equipment monitoring data, such as, e.g., oil temperatures, with values indicating an unsafe condition, the computer system can fail to disengage a mechanical lock out device. In another example, after identification of the equipment, the computer can present a safety check list, of conditions necessary to carry out intended repairs on the equipment, that must be met before the computer system will permit access to the equipment.

In another aspect of the invention, the computer system can maintain a record, e.g., of all completed maintenance, technician training, maintenance procedure times, and the like, to document regulatory compliance and for trend analysis.

EXAMPLE

The systems and methods of the invention can work together to provide safety to a condition monitoring technician by providing identification, confirmation, and documentation, as follows. A comprehensive safety system is chosen and installed to coordinate safety process in a large manufacturing plant with multiple technicians. A technician takes her portable computer and inputs her password before downloading her daily monitoring schedule from the central computer by means of LAN data transmission. The technician reads her first equipment location and task from a LED screen on her portable computer. The technician approaches the door to the work site and scans a label, using a bar-code scanner built into the portable computer, to receive an equipment identification and/or a safety confirmation assuring there is no hazard condition in the area containing the equipment to be monitored. The portable computer emits a safety confirmation beep and communicates a request to the central computer to disengage a remote lock out mechanism on the door. The technician enters the room and scans the identification label on the piece of equipment she intends to monitor, whereupon the portable computer energizes a red light and emits a warning alarm to provide the technician with a hazard warning that the equipment is an active unit not currently intended for monitoring or repair. The technician scans the correct unit for a safety confirmation beep and green light. After monitoring is complete on the unit, the technician confirms completion of the task and registers a request to monitor the first unit. The portable computer transmits the request to the central computer, which evaluates the process database to find the unit is necessary to current processes, then transmits denied authorization to monitor the active unit. The central computer updates the monitoring history of the equipment and task time for the technician.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A technician safety system comprising:

a portable computer comprising a scanner device;

software comprising a database of equipment maintenance information; and, one or more equipment identification labels readable by the scanner device and associated with a work site or piece of equipment;

whereby a technician can scan the one or more labels to receive a safety confirmation if the current time corresponds to an inactivation time for the equipment or equipment at the work site or a hazard warning if the current time does not correspond to an inactivation time for the equipment or equipment at the work site.

2. The system of claim 1, wherein the portable computer comprises a hand held computer or a lap top computer.

3. The system of claim 1, further comprising one or more central computers comprising a communication port whereby the central computer communicates with one or more of the portable computers.

4. The system of claim 3, wherein the communication port comprises wireless communications.

5. The system of claim 1, further comprising a lock out device or a tag out device.

6. The system of claim 5, wherein the lock out device is remotely controlled by a central computer.

7. The system of claim 1, wherein the equipment maintenance information comprises equipment identifications, equipment locations, technician identification, technician qualifications, equipment maintenance schedules, equipment inactivation times, process requirements for equipment activation, or equipment maintenance histories.

8. The system of claim 1, wherein the identification labels comprise bar-coded information.

9. The system of claim 1, wherein the safety confirmation or hazard warning is received by the technician in real time.

10. The system of claim 1, further comprising providing a safety confirmation at the piece of equipment or work site in real time.

11. A method of work environment safety determination, the method comprising:

inputting equipment maintenance information into a computer system, which information comprises equipment activation times or inactivation times;

scanning an identification label associated with a piece of equipment or work site, thereby inputting an equipment identification into the computer system;

determining the safety of the work environment by comparing the equipment identification to a current time and scheduled inactivation times, activation times, a safety checklist, or a database of monitored values; and, providing a safety confirmation if the current time corresponds to an inactivation time for the identified equipment or if the current time does not correspond to an activation time for the identified equipment; or providing a hazard warning if the current time does not correspond to an inactivation time for the identified equipment or if the current time corresponds to an activation time for the identified equipment.

12. The method of claim 11, wherein the computer comprises a portable computer.

13. The method of claim 11, wherein identifying comprises scanning a bar-coded label associated with the equipment or work site.

14. The method of claim 11, wherein inputting the equipment identification comprises transmitting equipment identification from a portable scanner to a central computer.

15. The method of claim 14, wherein the transmitting comprises wireless communication.

16. The method of claim 11, further comprising engagement of a lock-out mechanism at the work environment if a hazard warning condition exists.

17. The method of claim 11, further comprising:

inputting technician qualification information into the computer;

inputting technician identification into the computer;

inputting workplace entry requirements into the computer;

and confirming the identified technician is qualified to enter the work environment by comparing the technician identification, the technician qualifications and the entry requirements.

18. The method of claim 17, wherein inputting technician identification comprises input of a password.

19. The method of claim 17, further comprising engaging a lock-out condition if the technician qualifications do not meet the work environment entry requirements.

20. The method of claim 11, further comprising inputting task completion information in the computer to document compliance with regulations and schedules.

* * * * *